United States Patent
Kumar et al.

(10) Patent No.: US 12,529,339 B2
(45) Date of Patent: Jan. 20, 2026

(54) ENGINE STARTER CIRCUITS FOR ELECTRIC MACHINES

(71) Applicant: Hamilton Sundstrand Corporation, Charlotte, NC (US)

(72) Inventors: Dhananjay Kumar, Bangalore (IN); Krishan Kant Sharma, Kosi Kalan (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 270 days.

(21) Appl. No.: 18/199,952

(22) Filed: May 21, 2023

(65) Prior Publication Data
US 2023/0374942 A1    Nov. 23, 2023

(51) Int. Cl.
*F02C 7/26* (2006.01)
*H01H 47/00* (2006.01)
*H02P 3/22* (2006.01)

(52) U.S. Cl.
CPC .............. *F02C 7/26* (2013.01); *H01H 47/002* (2013.01); *F05D 2260/85* (2013.01)

(58) Field of Classification Search
CPC ... F02C 7/26; H02P 3/22; H02P 9/302; H01H 47/002
See application file for complete search history.

(56) References Cited

U.S. PATENT DOCUMENTS

| | | | |
|---|---|---|---|
| 2,804,579 A * | 8/1957 | Harris | H02H 3/13 361/104 |
| 4,179,646 A | 12/1979 | Russell | |
| 5,892,342 A | 4/1999 | Friedlander et al. | |
| 6,683,389 B2 | 1/2004 | Geis | |
| 9,120,390 B2 | 9/2015 | King et al. | |
| 11,142,075 B2 * | 10/2021 | Sengodan | B60L 7/22 |
| 2015/0137751 A1 | 5/2015 | King et al. | |
| 2019/0027290 A1 | 1/2019 | Wilson et al. | |
| 2020/0135373 A1 | 4/2020 | Muhammed et al. | |
| 2020/0224627 A1 * | 7/2020 | Banerjee | F02N 11/006 |
| 2021/0039499 A1 | 2/2021 | Sengodan | |
| 2025/0121696 A1 * | 4/2025 | Sengodan | H02P 3/22 |

OTHER PUBLICATIONS

Extended European Search Report, of the European Patent Office, dated Oct. 17, 2023, in corresponding European Patent Application No. 23174659.5.

* cited by examiner

*Primary Examiner* — Sisay G Tiku
(74) *Attorney, Agent, or Firm* — Kinney & Lange, P.A.

(57) ABSTRACT

In accordance with at least one aspect of this disclosure, an engine (e.g., an aircraft turbine engine) can include a turbine mounted to a turbine shaft to rotate the turbine. A starter system can include a starter circuit, for example for powering the starter system to start the engine. More specifically, the starter circuit can be configured to provide power to an electric machine (e.g., an electric motor capable of also acting as a generator) coupled to the turbine shaft to drive the engine.

20 Claims, 11 Drawing Sheets

ENGINE STARTER CIRCUITS FOR ELECTRIC MACHINES

CROSS-REFERENCE TO RELATED APPLICATIONS

This application claims priority to and the benefit of Indian Provisional Patent Application No. IN202241029365, filed May 22, 2022, the entire content of which is incorporated herein by reference.

TECHNICAL FIELD

The present disclosure relates to engine starters, and more particularly to starter circuits.

BACKGROUND

Typically, an electric motor is used to spin a main turbine shaft of an engine (e.g., an aircraft engine) to until there is enough air airflow through the compressor and combustion chamber to light the engine and spin the engine up to its operating speed. Starting an engine via an electric motor is typically governed by a master solenoid, which supplies electrical power through an inverter which is comprised of a plurality of switches. When the motor commanded to turn off, e.g., by closing one or more of the plurality of switches, the motor will continue to rotate because due inertia where the motor will act as a generator and thus pump back electrical energy to a DC bus which can increase voltage to on the bus to dangerously high values. To prevent this, a brake resistor circuit works by monitoring the DC bus voltage and activating the brake resistor circuit if it senses the DC link voltage above a set voltage, to absorb the excess voltage until the DC bus voltage drops below a safe voltage limit.

Typically, the solenoid and braking circuits each have two high side and two low switches connecting the solenoid coil and brake resistor respectively. In this set up, the solenoid and braking circuits will become functional when both switches are in the on state and current flows through an inductor coil of the solenoid or the brake resistors. But this also leads to an unnecessary duplication of common circuits which increases the number of circuit components as well as area occupied by the circuits on a circuit board. Therefore, there remains a need in the art for improvements to engine starter circuits in the aerospace industry. This disclosure provides a solution for this need.

SUMMARY

In accordance with at least one aspect of this disclosure, a system includes, a starter circuit configured to provide power to an electric machine to drive a load. The starter circuit includes a voltage input provided to the starter circuit via an electrical bus, a solenoid circuit configured to provide power to the electric machine, and a braking circuit configured to prevent power generated by the electric machine from reaching the electrical bus, wherein the solenoid circuit and the braking circuit are electrically connected the voltage input via a common switch. In embodiments, the common switch can be driven by a respective gate drive configured to control electrical communication from the electrical bus to the solenoid circuit and the braking circuit.

In embodiments, the solenoid circuit further can include an inductor coil configured to provide current to the electric machine, a freewheeling diode configured to provide a path for decay of current through the inductor coil, and a solenoid switch driven by a respective switch drive, configured to control electrical communication from the inductor coil to the electric machine. In embodiments, the braking circuit can include a brake resistor configured to provide a resistance to current generated by the electric machine flowing towards the electrical bus, a freewheeling diode configured to provide a path for decay of current through the brake resistor; and a brake switch driven by a respective switch drive, configured to control electrical communication from the electric machine to ground through the brake resistor and to prevent electrical communication from the electric machine to the electrical bus.

In embodiments, the common switch, the solenoid switch, and the brake switch each can include an insulated-gate bipolar transistor.

In embodiments, the system can further include an inverter, configured to invert a direct current supplied by the electrical bus into an alternating three phase current to be used by the electric machine. In embodiments, a power of breaking can be disposed between the inverter and the electric machine, configured to hold the electric machine 104 in a stand still mode when no power is applied to the electric machine.

In embodiments, a starter built-in-test (BIT) circuit can be included in the system. The starter BIT circuit can include a current sense resistor disposed between the common switch and each of the solenoid circuit and the braking circuit configured to sense a current flowing through the starter circuit to determine a state of the common switch and output a signal indicative of the state of the common switch to a controller.

A solenoid built-in-test (BIT) circuit can be included, where the solenoid BIT circuit can include a current sense resistor disposed between the inductor coil and the solenoid switch configured to sense a current flowing through the solenoid circuit to determine a state of the solenoid switch and output a signal indicative of the state of the solenoid switch to a controller. In embodiments, a braking built-in-test (BIT) circuit can be included where the braking BIT circuit including a current sense resistor disposed between the brake resistor and the braking switch configured to sense a current flowing through the braking circuit to determine a state of the brake switch and output a signal indicative of the state of the brake switch to a controller.

In embodiments, the system includes the controller and the controller can be configured to compare each of the signal indicative of the state of the common switch, the signal indicative of the state of the solenoid switch, and the signal indicative of the state of the brake switch to a respective reference state for the common switch, the solenoid switch, and the brake switch to determine if a fault has occurred in any of the starter circuit, the solenoid circuit, and/or the brake circuit.

In embodiments, the load can include an engine, and the system can further include the engine. The electric machine can be mechanically coupled to a turbine shaft of the engine to drive the engine (e.g., to start the engine). In certain embodiments, the engine can include an aircraft engine.

In accordance with at least one aspect of this disclosure, a method can include supplying a direct current from an electrical bus to a solenoid circuit and a braking circuit through a common switch, inverting the direct current to an alternating current, and driving an electric machine with the alternating current to start an engine.

The method can include, in a starter mode, maintaining the common switch in an on state, energizing an inductor coil, and placing a solenoid switch in an on state to connect an inverter to the electric machine to power the electric machine.

The method can include, in a braking mode, placing the solenoid switch in an off state to denergize the inductor coil, placing a freewheeling diode in an on state to provide a path for decay of current through a inductor coil. In the braking mode, the method can also include monitoring a voltage of the electrical bus, placing a brake switch in an on state when the voltage of the electrical bus exceeds a predetermined voltage threshold to connect a brake resistor of the braking circuit to ground, continuing monitoring the voltage of the electrical bus, and placing the brake switch in an off state when the voltage of the electrical bus is below the predetermined voltage threshold. In embodiments, the method can include, in an idle mode, placing the common switch, the solenoid switch, and the braking switch in an off state to prevent any current from being supplied from the electrical bus to the electric machine.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
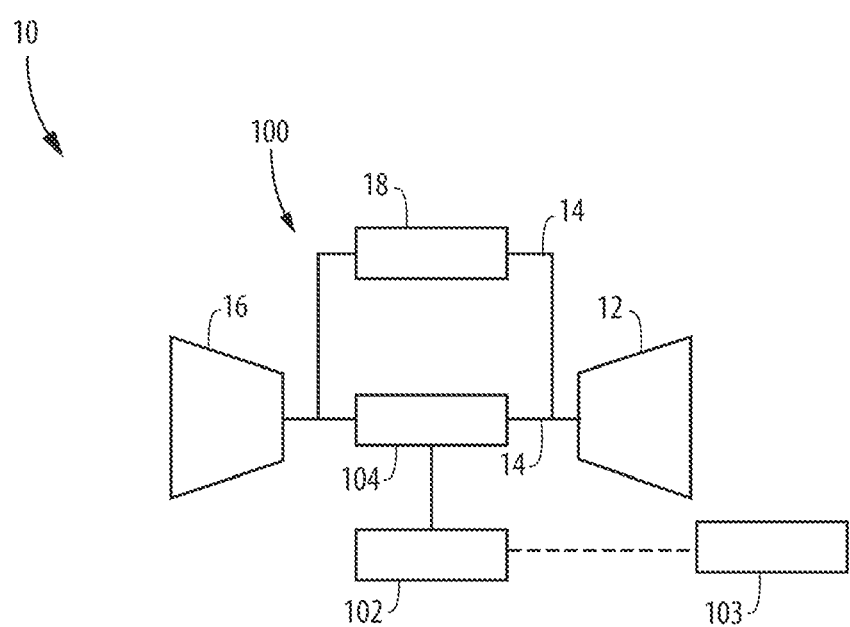
FIG. 1 is a schematic diagram of an engine in accordance with this disclosure, showing an embodiment of an engine starter system.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-10.

In accordance with at least one aspect of this disclosure, an engine 10 (e.g., an aircraft turbine engine) can include a turbine 12 mounted to a turbine shaft 14 to rotate the turbine 12. A starter system 100 can include a starter circuit 102, for example for powering the starter system 100 to start the engine 10. More specifically, the starter circuit 102 can be configured to provide power to an electric machine 104 (e.g., an electric motor capable of also acting as a generator) coupled to the turbine shaft 14 to drive the engine 10.

Figure 2:
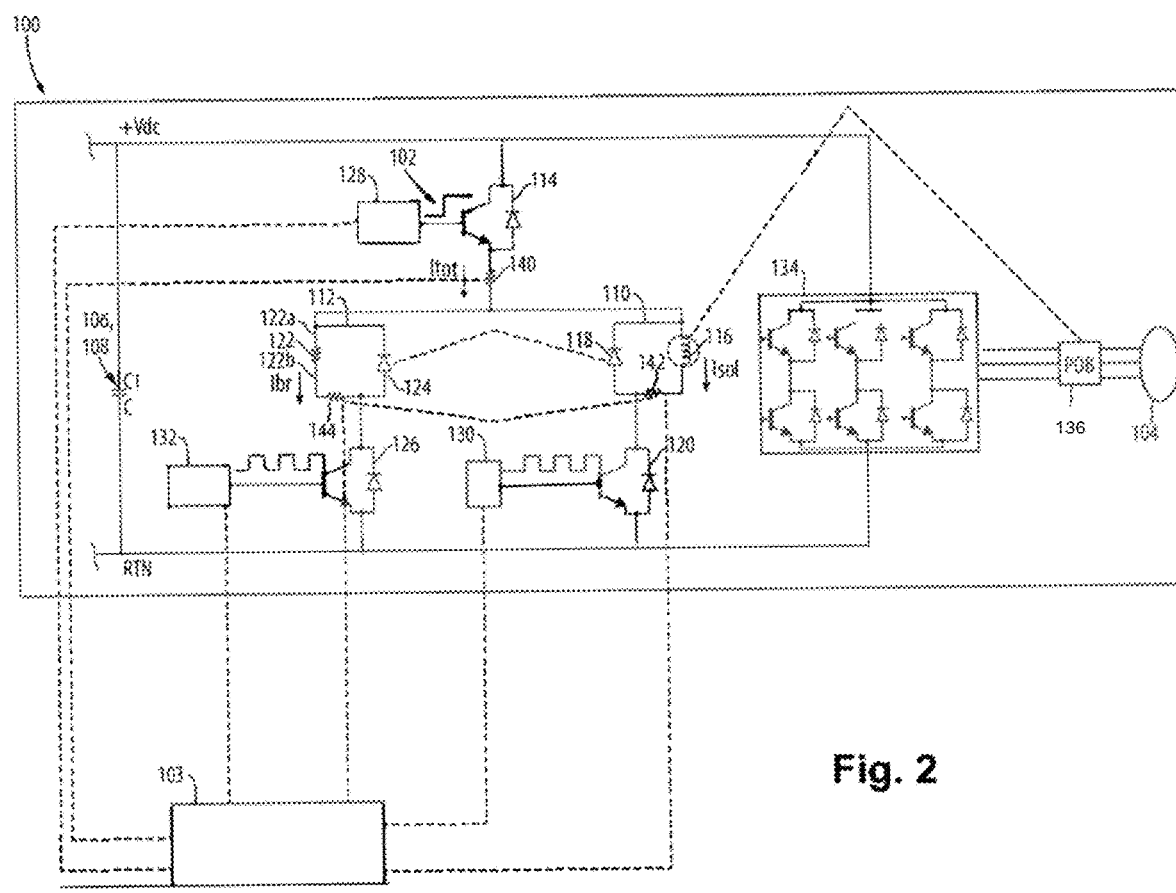
FIG. 2 is a schematic circuit diagram showing an embodiment of a starter circuit of the starter system of FIG. 1.

Referring now to FIG. 2, the starter circuit 102 can include a voltage input 106 provided to the starter circuit via an electrical bus 108, a solenoid circuit 110 configured to provide power to the electric machine 104, and a braking circuit 112 configured to prevent power generated by the electric machine 104 from reaching the electrical bus 108. As shown, the solenoid circuit 110 and the braking circuit 112 are electrically connected the voltage input 106 via a common switch 114 configured to control electrical communication from the electrical bus 108 to the solenoid circuit 110 and the braking circuit 112.

The solenoid circuit 110 can include an inductor coil 116 configured to provide current to the electric machine 104, a freewheeling diode 118 configured to provide a path for decay of current through the inductor coil 116, and a solenoid switch 120 configured to control electrical communication from the inductor coil 116 to the electric machine 104. The braking circuit 112 can include a brake resistor 122 configured to provide a resistance to current generated by the electric machine 104 flowing towards the electrical bus 108, a freewheeling diode 124 configured to provide a path for decay of current through the brake resistor 122, and a brake switch 126 configured to control electrical communication from the electric machine 104 to ground through the brake resistor 122 and to prevent electrical communication from the electric machine 104 to the electrical bus 108. The common switch 114, the solenoid switch 120, and the brake switch 126 can each include a respective insulated-gate bipolar transistor (IGBT) (e.g., as shown), driven by a respective gate drive 128, 130, 132 controlled by a controller 103.

An inverter 134 is disposed electrically between the starter circuit 102 and the electric machine 104 to invert a direct current supplied by the electrical bus 108 into an alternating three phase current to be used by the electric machine 104. A power of breaking 136 can be disposed between the inverter 134 and the electric machine 104, configured to hold the electric machine 104 in a "stand still" mode when no power is applied to the electric machine 104. The power of breaking 104 is operative when the electric machine 104 is not moving and receives its power from inverter 134. Said differently, the power of breaking 136 can be complementary to the solenoid drive operation.

Each of the starter circuit 102, the solenoid circuit 110, and the braking circuit 112 can include respective built-in-test (BIT) circuits. The starter BIT circuit can include a current sense resistor 140 disposed between the common switch 114 and each of the solenoid circuit 110 and the braking circuit 112 configured to sense a current flowing through the starter circuit 102 to determine a state of the common switch 114 and output a signal indicative of the state of the common switch 114 to the controller 103.

Similarly, the solenoid BIT circuit, can include a current sense resistor 142 disposed between the inductor coil 116 and the solenoid switch 120 configured to sense a current flowing through the solenoid circuit 110 to determine a state of the solenoid switch 120 and output a signal indicative of the state of the solenoid switch 120 to the controller 103.

Similarly still, the braking BIT circuit, can include a current sense resistor 144 disposed between the brake resistor 122 and the braking switch 126 configured to sense a current flowing through the braking circuit 112 to determine a state of the brake switch 126 and output a signal indicative of the state of the brake switch 126 to the controller 103.

The controller 103 can include one or more comparators where, upon receiving each of the aforementioned state signals, one or more of the comparators can be configured to compare each of the signal indicative of the state of the common switch 114, the signal indicative of the state of the solenoid switch 120, and the signal indicative of the state of the brake switch 126 to a respective reference state to determine if a fault has occurred in any of the starter circuit 102, the solenoid circuit 110, and/or the brake circuit 112. For example, a BIT circuit state table for all possible states of the switches is shown in table 1.

TABLE 1

| State | Common Switch | Brake Switch | Solenoid Switch | Current Condition |
|---|---|---|---|---|
| 1 | 0 | 0 | 0 | Idle Condition |
| 2 | 0 | 0 | 1 | Itot = 0, Isol = 0, Ibr = 0 |
| 3 | 0 | 1 | 0 | Itot = 0, Isol = 0, Ibr = 0 |
| 4 | 0 | 1 | 1 | Itot = 0, Isol = 0, Ibr = 0 |
| 5 | 1 | 0 | 0 | Itot = 0, Isol = 0, Ibr = 0 |
| 6 | 1 | 0 | 1 | Itot = Isol, Ibr = 0 |
| 7 | 1 | 1 | 0 | Itot = Ibr, Isol = 0 |
| 8 | 1 | 1 | 1 | Itot = Isol + Ibr |

If the BIT circuit is in any of states 1-4, any fail in a given condition will output a BIT result of short circuit. IF the BIT circuit is in any of states 7 or 8, any fail in a given condition will output a BIT result of open circuit. If the BIT circuit is in any of states 5 or 6, any fail in a given condition will output a BIT result of either short circuit or open circuit.

Because the common switch 114 controls electrical communication from the bus 108 to both the solenoid circuit 110 and the braking circuit 112, if the common switch 114 is OFF (i.e. 0), then both the solenoid BIT circuit and the braking BIT circuit should see no current flow therethrough, regardless of the state of the solenoid and brake switches 120, 126. Therefore if a current is sensed in either of the solenoid BIT circuit or the braking BIT circuit across the respective current sense resistor when the common switch 114 is in state 0, a short circuit will be indicated by the controller. A similar logic can be applied for the remaining states, when the common switch 114 is in ON (i.e. 1).

In accordance with at least one aspect of this disclosure, a method, can include supplying a direct current from an electrical bus (e.g., bust 108) to a solenoid circuit (e.g. circuit 110) and a braking circuit (e.g., circuit 112) through a common switch (e.g., switch 114), inverting the direct current to an alternating current, and driving an electric machine (e.g., electric machine 104) with the alternating current to start an engine (e.g., engine 10).

In a starter mode, i.e. when starting the engine, the method can include, maintaining the common switch in an ON state, energizing an inductor coil (e.g., coil 116), and placing a solenoid switch (e.g., switch 120) in an ON state to connect an inverter (e.g., inverter 134) to the electric machine to power the electric machine.

In a braking mode, i.e. when the engine is running at operational speed and the starter is no longer needed, the method can include placing the solenoid switch in an OFF state to denergize the inductor coil, placing a freewheeling diode (e.g., diode 118) in an ON state to provide a path for decay of current through a inductor coil and monitoring a voltage of the electrical bus. The method can further include, placing a brake switch (e.g., switch 126) in an ON state when the voltage of the electrical bus exceeds a predetermined voltage threshold to connect a brake resistor (e.g., resistor 122) of the braking circuit to ground and continuing to monitor the voltage of the electrical bus. The method can further include placing the brake switch in an OFF state when the voltage of the electrical bus drops below the predetermined voltage threshold.

In embodiments, an idle mode can include placing all of the common switch, the solenoid switch, and the braking switch in an off state to prevent any current from being supplied from the electrical bus to the electric machine.

Conventionally, the solenoid derive control and braking control of an electric machine (e.g., motor) regeneration energy are provided in two separate circuits, each with respective drives. Embodiments combine these two circuits together to reduce total number of components for the system 100, as well as reduce area used on the circuit board and the cost of the circuit altogether. Embodiments of the described common drive approach can also reduce the firmware implementation burden and combine the high side current sensing.

As shown in FIG. 1, the circuit 102 includes one less IGBT than a conventional circuit of this kind. Because the high side switches are connected to the same DC line for both circuits (e.g., the brake and circuit), and a gate pulse for both switches is the same for all conditions in which the starter is operational, it is possible to eliminate one of the IGBTs, and share a common IGBT (e.g., common switch 114) for both circuitries. One having ordinary skill in the art would appreciate embodiments of the topology described herein can utilize a working principle similar to conventional topology without compromising the functionality of any block, for example as explained in more detail below.

In embodiments, the common switch 114 is always ON, so control of solenoid inductor coil 116 energization will be decided by the solenoid switch 120. As the solenoid switch driver 130 receives the control signal from the controller 103, the switch driver 130 will turn on the solenoid switch 120 which will consequently solenoid inductor coil 116. This will aid in establishing the electrical connection between the inverter and the electric machine. Importantly, the solenoid switch 120 turned ON before the inverter 134 is turned ON. Thus, when the inverter 134 is commanded to turn ON, electrical power can reach the motor without any interruption. Upon receiving the OFF signal from the controller 103, the solenoid switch drive 130 will turn the solenoid switch OFF and the solenoid inductor coil 116 will de-energize. The freewheeling diode 118 will turn ON and provide a path for decay of current through the solenoid coil 116.

When the electric machine 104 is then commanded OFF (e.g., when it is no longer needed for starting), the energy generated by rotation of electric machine 104 due to inertia will feed back to the source (e.g., the electrical bus 108), making the electric machine 104 behave as a generator. This will cause a voltage rise on the bus 108, and, if this voltage is not controlled, the voltage increase could rise to levels causing permanent damage on the IGBTs and other components within the circuit 102.

Because the common switch is always ON, a first of the brake resistor terminals 122a will always be connected to a +Vdc input line. To dissipate excess energy across the electrical bus 108 (e.g., a DC link capacitor as shown), the braking switch 126 should be pulled to the RTN return path.

The turning ON and OFF of the brake switch will be based on a voltage monitoring circuit of the electrical bus 108. As the bus voltage rises to a certain level, e.g., with respect to a given voltage threshold, the brake switch 126 will receive a high pulse and will connect a second of the brake resistor terminals 122*b* to ground, allowing energy to dissipate across the brake resistor 122, instead of the electrical bus 108, to reduce the voltage across the bus 108 level to safe limit (e.g., below the threshold). Once the bus voltage reduces to safe limit, the brake switch 126 will turn OFF and no current will flow through the braking circuit 112.

Figure 3:
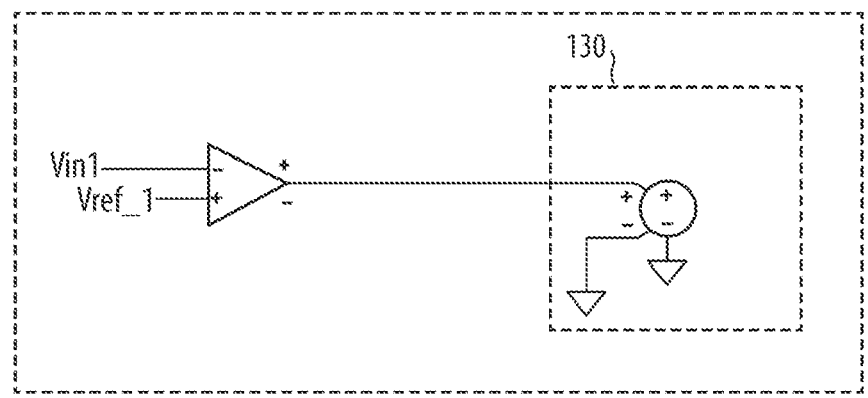
FIG. 3 is a schematic logic diagram of a component of the starter circuit of FIG. 2.
Figure 4:
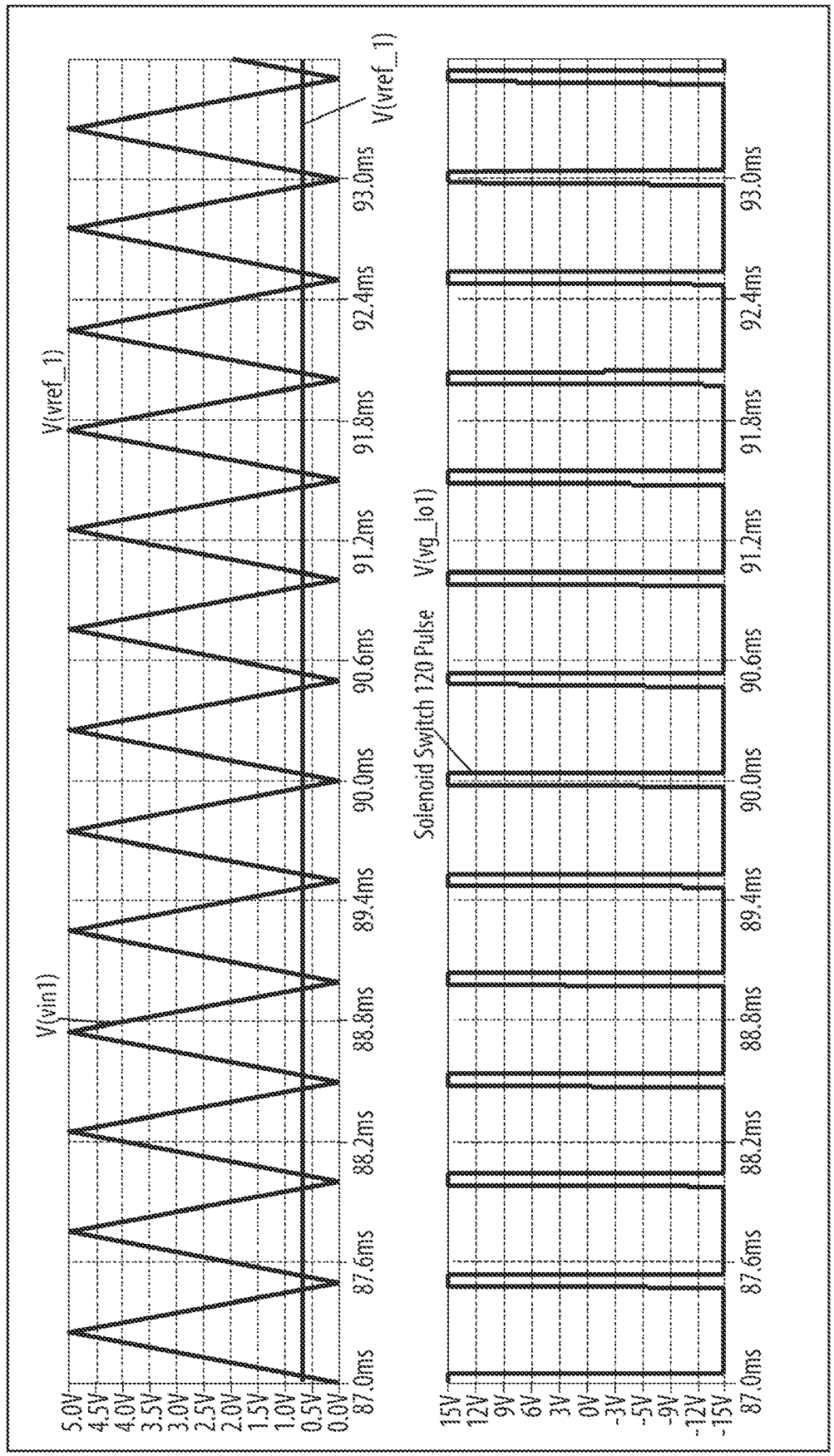
FIG. 4 is a waveform diagram of PWM waveforms for the component of FIG. 3.
Figure 5:
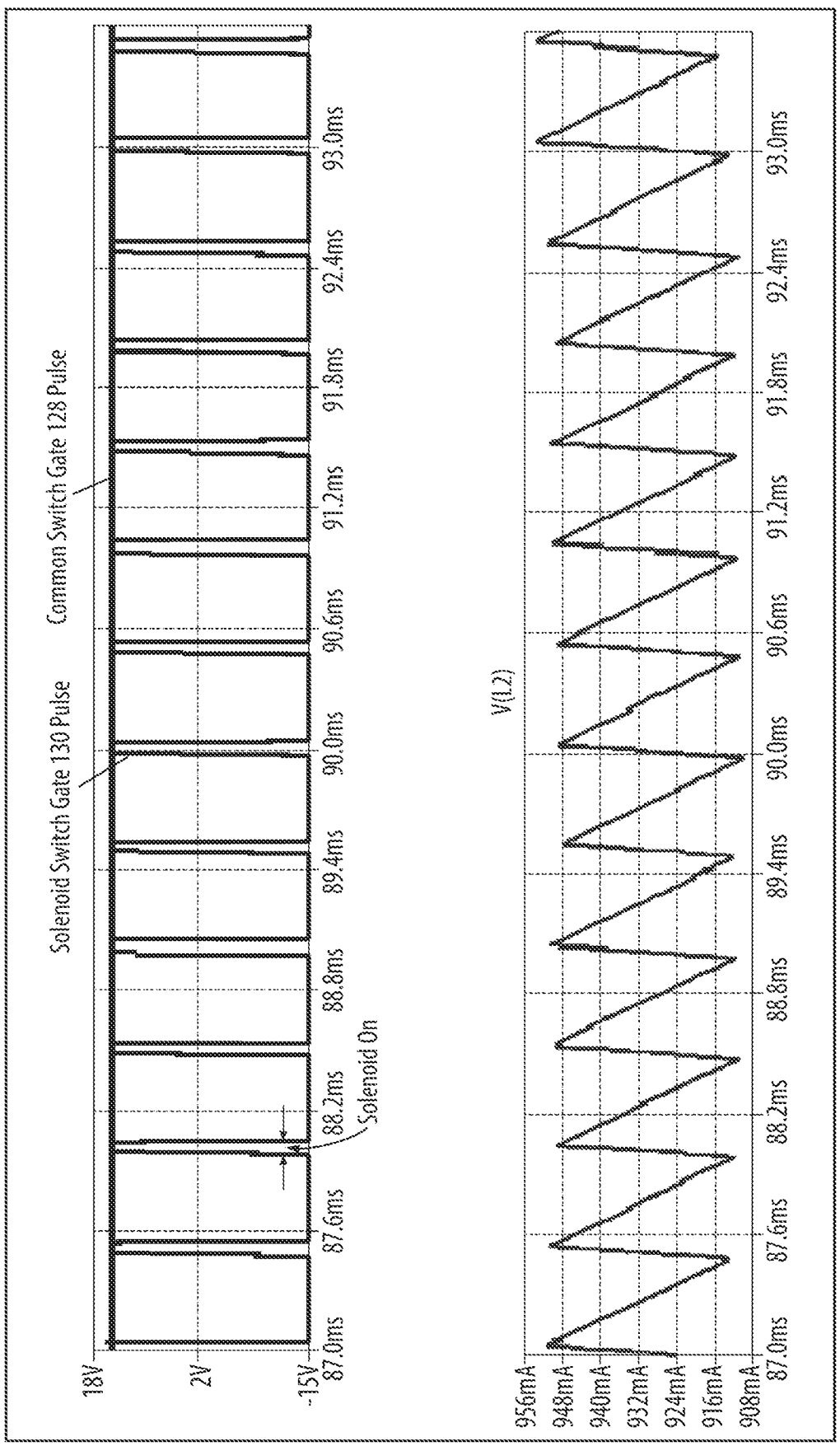
FIG. 5 is a waveform diagram of current waveforms for the component of FIG. 3.

The control and driving of the common switch 114, the solenoid switch 120 and the brake switch 126 can include using pulse width modulation (PWM) output from the controller 103 and/or the gate drivers 128, 130, 132. For the solenoid switch 120, as shown in FIGS. 3-5, each PWM pattern is calculated by comparing a demand value with a triangular waveform of the appropriate frequency. Here, the common switch 114 is always high throughout the operation of the starter 100. Therefore, only one triangular signal used to generate the PWM. Because of this, triangular waveform for the operating frequency will be compared with a reference voltage. The value of the reference voltage will be dependent on solenoid current requirement. As discussed above, the solenoid switch 120 will only be ON when both the common switch 114 and the solenoid switch 120 have high pulse. This can be seen in FIG. 4, where Vin is the triangular waveform which will be compared with Vref_1 to generate PWM pulse for turning ON the solenoid switch 120. FIG. 4 shows the solenoid PWM waveform. Here, Verf_1 amplitude tunes such that the solenoid hold on current will be 1A, where 2 kHz frequency of triangular signal. FIG. 5 shows the solenoid current waveform. As can be seen in FIG. 5, it is clear that solenoid coil 116 is energizing only when both switch pulse high.

Figure 6:
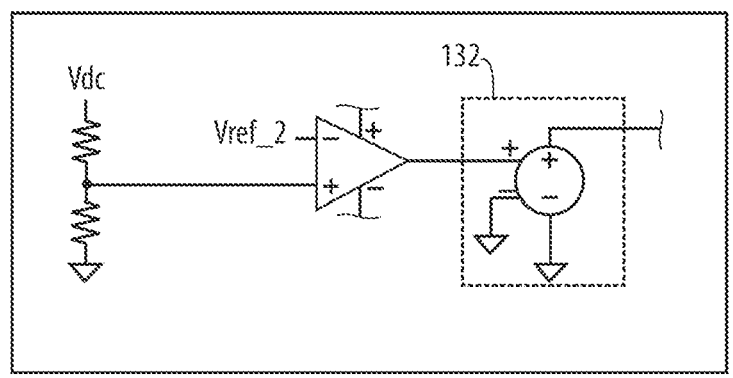
FIG. 6 is a schematic logic diagram of another component of the starter circuit of FIG. 2.
Figure 7:
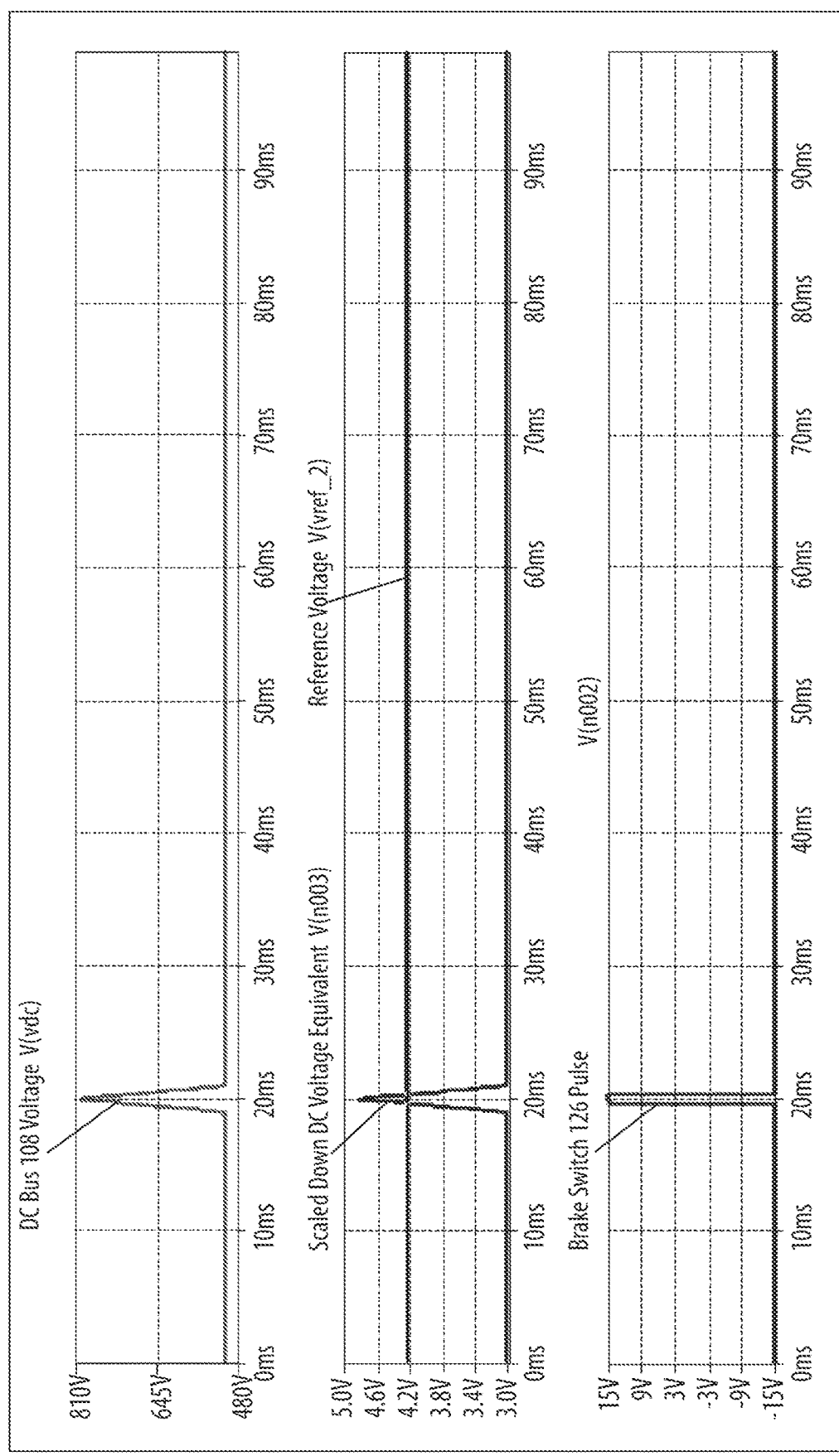
FIG. 7 is a waveform diagram of PWM waveforms for the component of FIG. 6.
Figure 8:
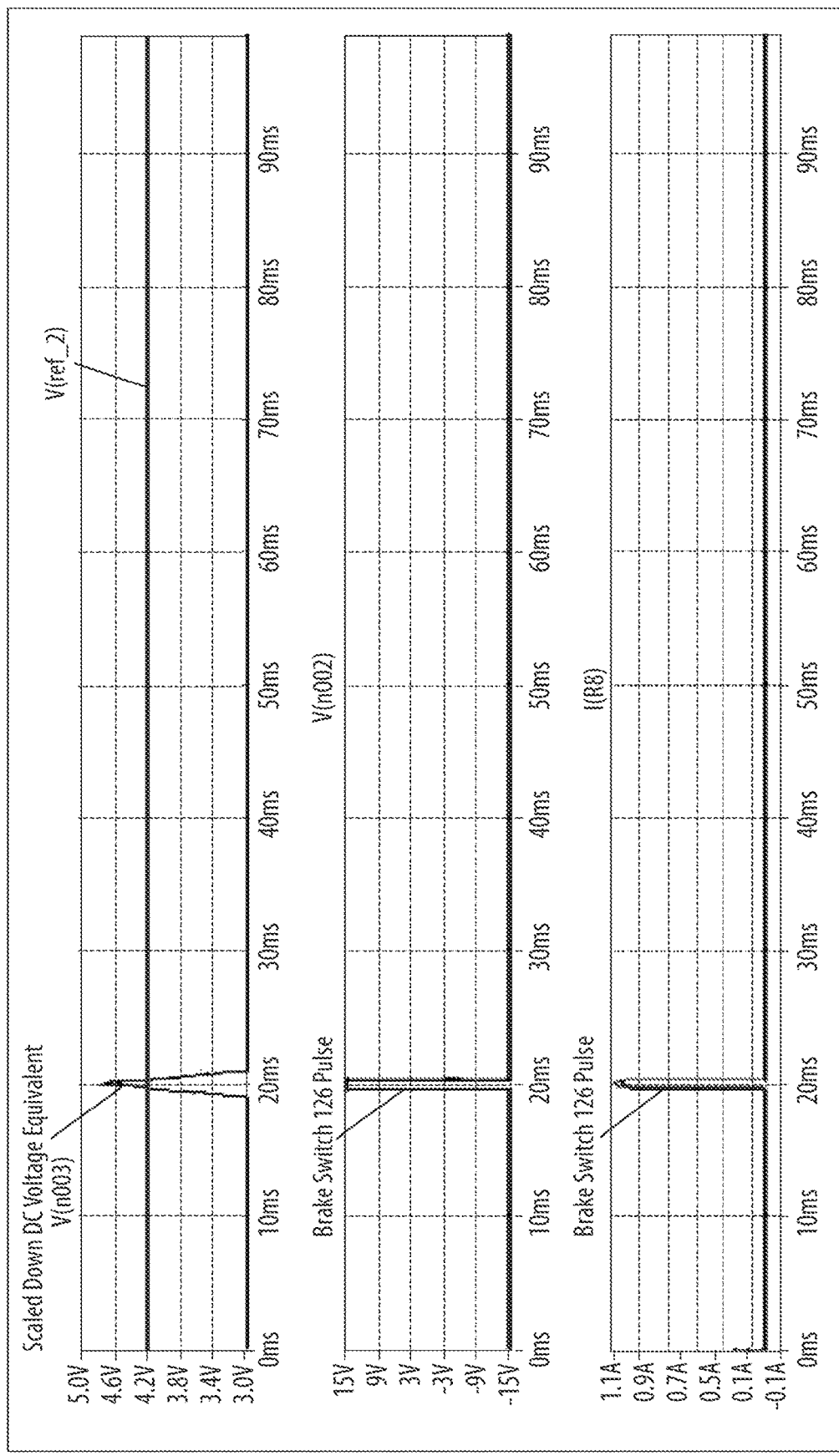
FIG. 8 is a waveform diagram of current waveforms for the component of FIG. 6.

With reference now to the braking circuit, as shown in FIGS. 6-8, the assumption is made that a given electrical bus voltage range is 500 Vdc to 650 Vdc and the brake resistor trigger point is 700 Vdc. FIGS. 6-8 show the brake circuit 112 PWM generation, the brake circuit 112 PWM waveform, and the brake resistor 122 current, respectively. As can be seen in FIGS. 5 and 6, using the assumption, the high electrical bus voltage is scaled down to a measuring voltage range 3V to 5V which will be compared with reference voltage (equivalent to 700 Vdc threshold). Once the electrical bus 108 voltage crosses the threshold limit, the output of comparator will be high, thus turning on the brake switch 126 to allow the brake resistor 122 to start dissipating extra energy consumed by electrical bus 108, lowering the bus voltage to a safe value. The period of ON state for the brake switch 126 will depend on the time needed to lower the bus voltage below the voltage threshold.

Figure 9:
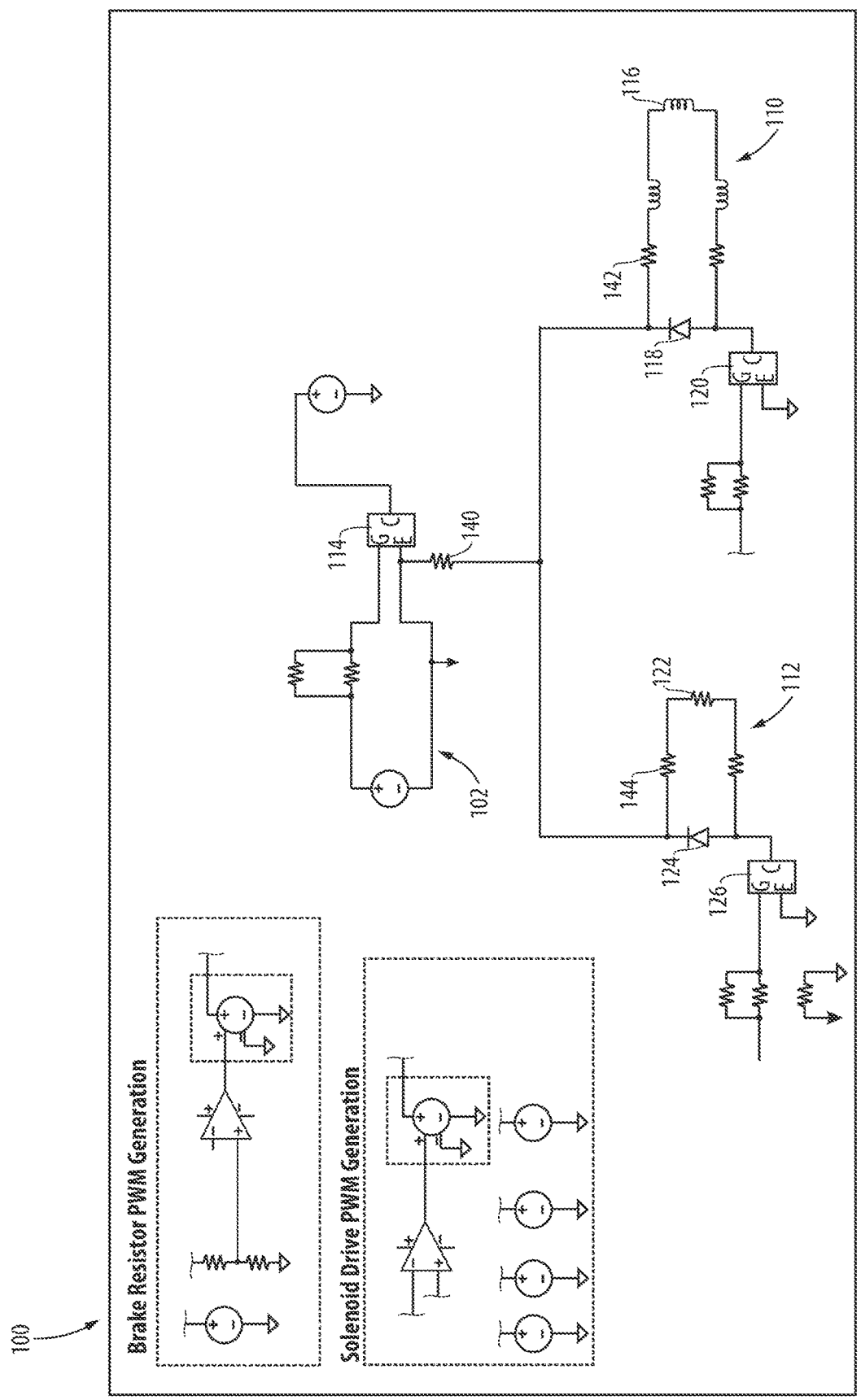
FIG. 9 is a detailed circuit diagram for an example circuit having features of the starter circuit of FIG. 2.
Figure 10:
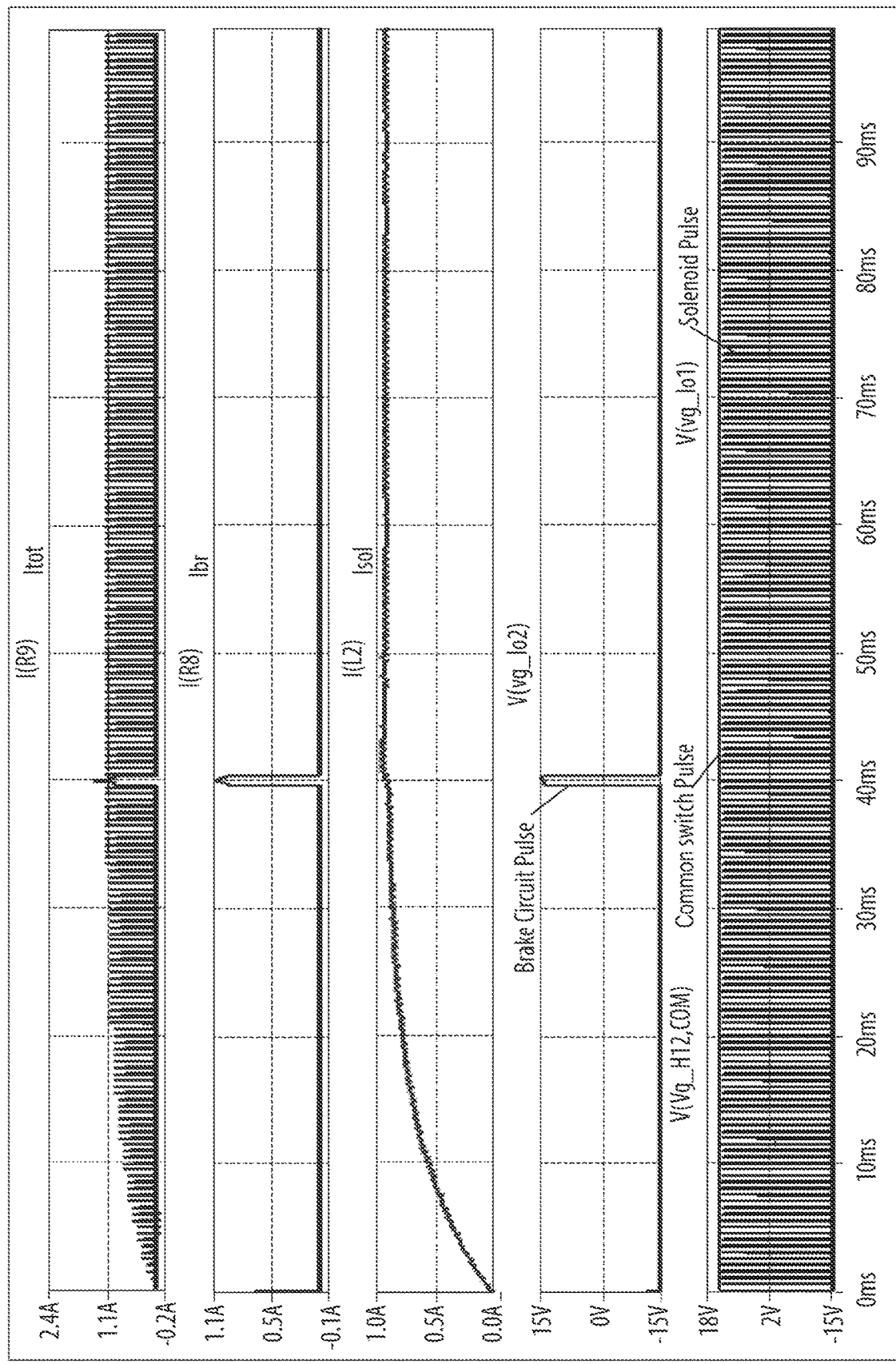
FIG. 10 is a waveform diagram of the waveforms for the circuit of FIG. 9.
Figure 11:
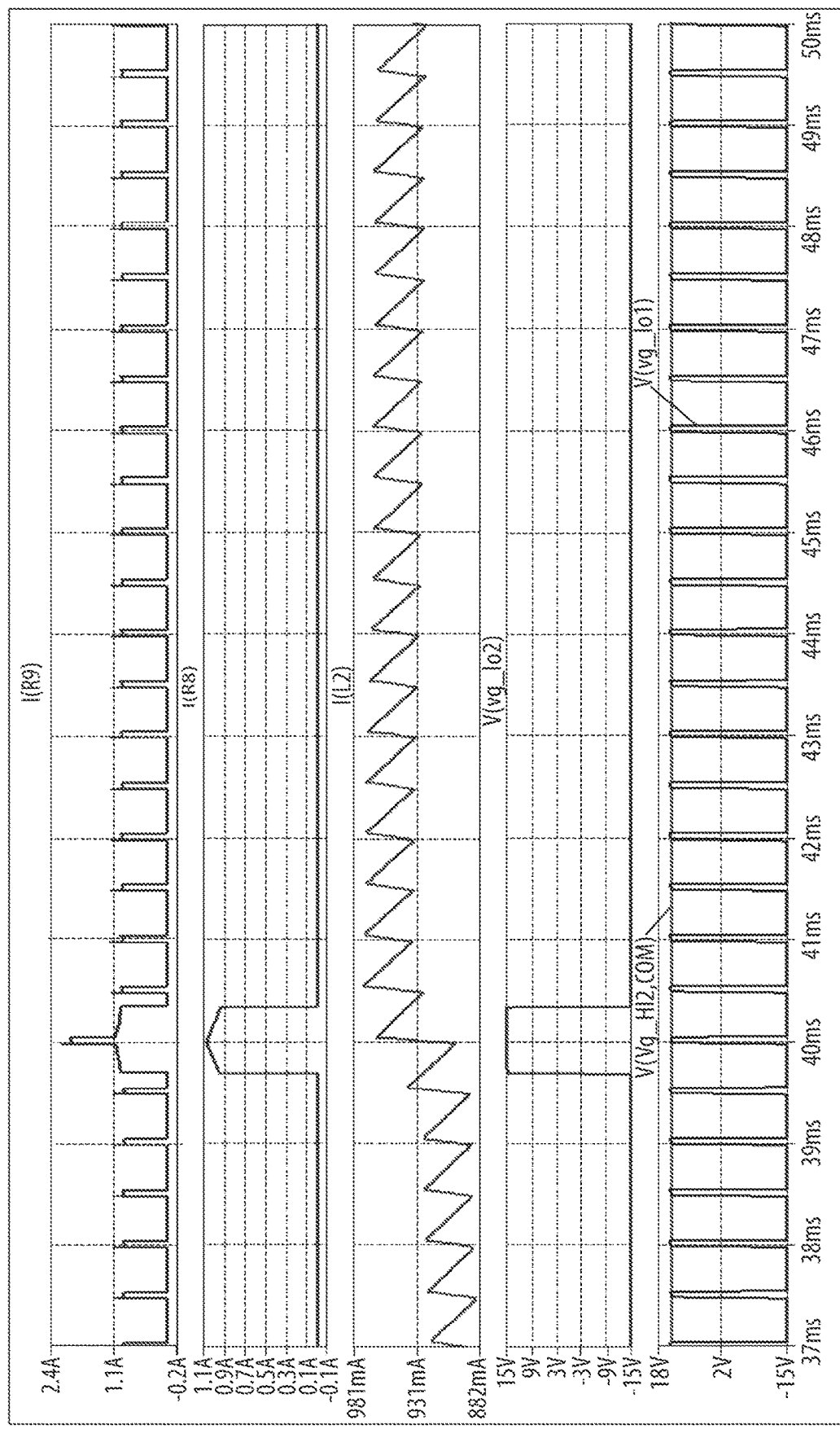
FIG. 11 is an enlarged waveform diagram of the waveforms of FIG. 10.

FIGS. 9-11 show an example circuit and the representative waveforms for an assumption of a given bus 108 having a voltage range of 500 V to 800 VD, the brake resistor 122 trigger point of 700 VDC and a solenoid switching frequency of 2 kHz.

The BIT scheme can be a combination of high and low logic signals on the switches which will allow identifying faults within the solenoid circuit 110, braking circuit 112 and respective monitoring circuits. Effectively, there should not be any current flowing through the sense resistors during states 2,3,4, and 5. If there is, then one of the devices may have failed due to short circuit or the load may have failed short to a chassis, for example. Current flow should be seen in state 7 where both switches are closed for solenoid and brake resistor. If there is no current flow, then one of the devices may be stuck in open circuit state. Each of the current sense resistors 140, 142, 144 will measure each current Itot (total current across the starter circuit resistor 140), Isol (current across the solenoid circuit resistor 142), Ibr (current across the braking circuit resistor 144). The current data is fed to the controller 103 to check the health of the circuit as a whole. If any of the conditions outlined above in table 1 fail, then there is either open or short circuit in the system 100.

As described, embodiments can eliminate one an IGBT and instead share a common for both the sections on the high side. This reduces part number and overall net cost, and increases real estate on a printed circuit board. In embodiments, the BIT circuit(s) is the interface between controller circuitry and provides functional checks such as drive signal integrity, solenoid coil functionality and accuracy of brake resistance value. Because one less IGBT is used, one less driver is needed, which reduces the overhead on the BIT circuit. Similar advantages can be realized by the processor such as increased speed due to reduced overhead. By eliminating an entire drive circuit, the processor is required to send one less control signal, freeing up an additional I/O port.

Embodiments provide for a reduction in sense resistors for short detection. Because the high side switch is common to both circuits, only one sense resistor is used for detecting short between terminal (solenoid terminal) with itself or with ground. So, control circuit is become as there is only one single resistor. Embodiments having the topology described herein, a considerable amount of space in the PCB is being saved and the net materials cost is also reduced, without sacrificing functionality of the system. This topology could thus provide distinct technical advantages as an alternative over the present topology in engine starter systems.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," "controller," or "system." A "circuit," "module," "controller," or "system" can include one or more portions of one or more separate physical hardware and/or software components that can together perform the disclosed function of the "circuit," "module," "controller," or "system", or a "circuit," "module," "controller," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in tg1 he claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
   a starter circuit configured to provide power to an electric machine to drive a load, the starter circuit including:
   a voltage input provided to the starter circuit via an electrical bus;
   a solenoid circuit configured to provide power to the electric machine,
   wherein the solenoid circuit includes:
   an inductor coil configured to provide current to the electric machine;
   a freewheeling diode configured to provide a path for decay of current through the inductor coil; and
   a solenoid switch driven by a respective switch drive, configured to control electrical communication from the inductor coil to the electric machine; and
   a braking circuit configured to prevent power generated by the electric machine from reaching the electrical bus, wherein the solenoid circuit and the braking circuit are electrically connected the voltage input via a common switch, wherein the common switch is driven by a respective gate drive configured to control electrical communication from the electrical bus to the solenoid circuit and the braking circuit.

2. The system of claim 1, wherein the braking circuit further includes:
   a brake resistor configured to provide a resistance to current generated by the electric machine flowing towards the electrical bus;
   a freewheeling diode configured to provide a path for decay of current through the brake resistor; and
   a brake switch driven by a respective switch drive, configured to control electrical communication from the electric machine to ground through the brake resistor and to prevent electrical communication from the electric machine to the electrical bus.

3. The system of claim 2, wherein the common switch, the solenoid switch, and the brake switch each include an insulated-gate bipolar transistor.

4. The system of claim 2, further comprising an inverter, configured to invert a direct current supplied by the electrical bus into an alternating three phase current to be used by the electric machine.

5. The system of claim 4, further comprising a power of breaking can be disposed between the inverter and the electric machine, configured to hold the electric machine in a stand still mode when no power is applied to the electric machine.

6. The system of claim 4, further comprising a starter built-in-test (BIT) circuit, the starter BIT circuit including a current sense resistor disposed between the common switch and each of the solenoid circuit and the braking circuit configured to:
   sense a current flowing through the starter circuit to determine a state of the common switch; and
   output a signal indicative of the state of the common switch to a controller.

7. The system of claim 6, further comprising a solenoid built-in-test (BIT) circuit, the solenoid BIT circuit including a current sense resistor disposed between the inductor coil and the solenoid switch configured to:
   sense a current flowing through the solenoid circuit to determine a state of the solenoid switch; and output a signal indicative of the state of the solenoid switch to the controller.

8. The system of claim 7, further comprising a braking built-in-test (BIT) circuit, the braking BIT circuit including a current sense resistor disposed between the brake resistor and the braking switch configured to:
sense a current flowing through the braking circuit to determine a state of the brake switch; and
output a signal indicative of the state of the brake switch to the controller.

9. The system of claim 8, wherein the controller is configured to compare each of the signal indicative of the state of the common switch, the signal indicative of the state of the solenoid switch, and the signal indicative of the state of the brake switch to a respective reference state for the common switch, the solenoid switch, and the brake switch to determine if a fault has occurred in any of the starter circuit, the solenoid circuit, and/or the brake circuit.

10. The system of claim 1, wherein the load includes an engine, and further comprising the engine, wherein the electric machine is mechanically coupled to a turbine shaft of the engine to drive the engine.

11. The system of claim 10, wherein the engine includes an aircraft engine.

12. A method, comprising:
supplying a direct current from an electrical bus to a solenoid circuit and a braking circuit through a common switch;
inverting the direct current to an alternating current; and
driving an electric machine with the alternating current to start an engine;
wherein in a starter mode:
maintaining the common switch in an on state;
energizing an inductor coil; and
placing a solenoid switch in an on state to connect an inverter to the electric machine to power the electric machine;
wherein in a braking mode:
placing the solenoid switch in an off state to deenergize the inductor coil;
placing a freewheeling diode in an on state to provide a path for decay of current through the inductor coil; and
monitoring a voltage of the electrical bus;
placing a brake switch in an on state when the voltage of the electrical bus exceeds a predetermined voltage threshold to connect a brake resistor of the braking circuit to ground;
monitoring the voltage of the electrical bus; and
placing the brake switch in an off state when the voltage of the electrical bus is below the predetermined voltage threshold.

13. The method of claim 12, further comprising, in an idle mode:
placing the common switch, the solenoid switch, and the braking switch in an off state to prevent any current from being supplied from the electrical bus to the electric machine.

14. A system, comprising:
a starter circuit configured to provide power to an electric machine to drive a load, the starter circuit including:
a voltage input provided to the starter circuit via an electrical bus;
a solenoid circuit configured to provide power to the electric machine, wherein the solenoid circuit includes:
an inductor coil configured to provide current to the electric machine;
a freewheeling diode configured to provide a path for decay of current through the inductor coil; and
a solenoid switch driven by a respective switch drive, configured to control electrical communication from the inductor coil to the electric machine; and
a braking circuit configured to prevent power generated by the electric machine from reaching the electrical bus, wherein the solenoid circuit and the braking circuit are electrically connected the voltage input via a common switch, wherein the common switch is driven by a respective gate drive configured to control electrical communication from the electrical bus to the solenoid circuit and the braking circuit;
wherein the load includes an engine, and further comprising the engine, wherein the electric machine is mechanically coupled to a turbine shaft of the engine to drive the engine;
wherein the engine includes an aircraft engine.

15. The system of claim 14, wherein the braking circuit further includes:
a brake resistor configured to provide a resistance to current generated by the electric machine flowing towards the electrical bus;
a freewheeling diode configured to provide a path for decay of current through the brake resistor; and
a brake switch driven by a respective switch drive, configured to control electrical communication from the electric machine to ground through the brake resistor and to prevent electrical communication from the electric machine to the electrical bus.

16. The system of claim 15, wherein the common switch, the solenoid switch, and the brake switch each include an insulated-gate bipolar transistor.

17. The system of claim 15, further comprising an inverter, configured to invert a direct current supplied by the electrical bus into an alternating three phase current to be used by the electric machine.

18. The system of claim 17, further comprising a power of breaking can be disposed between the inverter and the electric machine, configured to hold the electric machine in a stand still mode when no power is applied to the electric machine.

19. The system of claim 17, further comprising a starter built-in-test (BIT) circuit, the starter BIT circuit including a current sense resistor disposed between the common switch and each of the solenoid circuit and the braking circuit configured to:
sense a current flowing through the starter circuit to determine a state of the common switch; and
output a signal indicative of the state of the common switch to a controller.

20. The system of claim 19, further comprising a solenoid built-in-test (BIT) circuit, the solenoid BIT circuit including a current sense resistor disposed between the inductor coil and the solenoid switch configured to:
sense a current flowing through the solenoid circuit to determine a state of the solenoid switch; and
output a signal indicative of the state of the solenoid switch to the controller.

* * * * *